United States Patent
Doerr et al.

(10) Patent No.: US 6,393,173 B1
(45) Date of Patent: May 21, 2002

(54) 2×2 INTEGRATED OPTICAL CROSS-CONNECT

(75) Inventors: Christopher Richard Doerr, Middletown, NJ (US); Pierre Schiffer, Delft (NL)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/535,785

(22) Filed: Mar. 28, 2000

(51) Int. Cl.[7] .................................................. G02B 6/35
(52) U.S. Cl. ............................ 385/16; 385/24; 385/18
(58) Field of Search .............................. 385/14–18, 24; 359/127, 128

(56) References Cited

U.S. PATENT DOCUMENTS

| | | | | | |
|---|---|---|---|---|---|
| 5,974,207 A | * | 10/1999 | Aksyuk et al. | ................ | 385/24 |
| 6,148,124 A | * | 11/2000 | Aksyuk et al. | ................ | 385/24 |
| 6,240,222 B1 | * | 5/2001 | Bergmann | ................ | 385/24 |
| 6,266,460 B1 | * | 7/2001 | Doerr | ................ | 385/16 |

* cited by examiner

*Primary Examiner*—John D. Lee
*Assistant Examiner*—Sarah U Song
(74) *Attorney, Agent, or Firm*—Howard R. Popper

(57) ABSTRACT

An optical circulator is connected to each end of an integrated circuit chip containing a pair of multiplexer/demuliplexers driving respective arrays of 2×2 MZIs separated by a striped mirror interface and a plate having a thickness of ¼ the central wavelength on each side of the mirror. Light passes through the device twice making it polarization insensitive in power and in wavelength. Phase errors due to inserting these plates will not cause power disturbances because no interference exists. Because the same router is used for multiplexing/demultiplexing, there are no loss/crosstalk penalties for through-channels due to mismatch in wavelength response. Back reflections for the switch-conditions are suppressed by aligning the waveguide, which passes the striped mirror, under a slight angle so that reflected light at the interface will penetrate the substrate. Lateral offset applied between the ends of two waveguides at the mirror interface ensures that crosstalk performance is not limited.

11 Claims, 1 Drawing Sheet

2×2 INTEGRATED OPTICAL CROSS-CONNECT

FIELD OF THE INVENTION

This invention relates to apparatus for effecting communication between two or more optical ring networks and, more particularly to optical wavelength-selective cross-connects.

BACKGROUND OF THE PRIOR ART

Optical wavelength-selective cross-connects can be used for effecting communications between ring networks and other related applications are typically fabricated using bulk/fiber optics. Another approach is disclosed in U.S. Pat. No. 5,940,551 which shows a wavelength cross-connect for interconnecting nodes made up of a plurality of 2 by 2 wavelength cross-connects. Each 2×2 cross-connect is comprised of two circulators connected together through the medium of a fiber grating that is connected between intermediate ports of the circulators. The fiber grating reflects certain of the wavelength channels in the input signals delivered to the inputs and transmit remaining wavelength channels, thereby enabling each node to communicate with each other node. For planar devices, typical cross-connects are made using two de/multiplex pairs connected by an array of switches for controlling transmission (see K. Okamoto, et. al., Electron. Lett., vol. 32, pp. 1471–1472, 1996, for example). This involves many waveguide crossings which produce high loss, poor crosstalk performance and large device size. Use of a "dilated" switch arrangement (which requires four switches per wavelength) involves even more crossings and the greater number of switches limits the amount of achievable miniaturization and power conservation. While the 2×2 planar cross-connect can be made with crossings it would be extremely advantageous to be able to fabricate a device capable of cross-connecting a large plurality of channels without waveguide crossings.

SUMMARY OF THE INVENTION

In accordance with one aspect of the principles of the invention, an illustrative planar waveguide provides an integrated, multi-channel optical cross-connect with improved crosstalk performance, decreased polarization sensitivity, low power consumption and small device size without the need for any waveguide crossings. The intermediate ports of a pair of optical circulators are connected to respective ends of an integrated circuit chip containing a pair of grating multiplexer/demultiplexers driving a respective array of 2×2 Mach-Zehnder interferometers separated by a striped mirror interface and a plate having a thickness of one quarter of the central wavelength on each side of the mirror. The light passes through the device twice making the device polarization insensitive, both in power as well as in wavelength. Any phase errors due to inserting these plates will not cause any disturbances in power, because no interference exists. Because the same router is used for multiplexing and demultiplexing, there are no loss or crosstalk penalties for the through-channels due to mismatch in wavelength response. Back reflections for the switch-condition are suppressed by aligning the waveguide, which passes the striped mirror, under a slight angle so that the reflected light at the interface will penetrate the substrate. To ensure that crosstalk performance is not limited by an imperfect mirror (e.g. T≠0), a lateral offset is applied between the ends of the two waveguides with mirrors at the interface. The operating wavelength window of the device can be chosen after fabrication by coupling from the fiber-end directly in the star couplers with two single fibers: no ribbons are necessary.

BRIEF DESCRIPTION OF THE DRAWING

The foregoing and other features of the present invention are exhibited in the illustrative embodiment which will become more apparent from a reading of the ensuing description, together with the drawing, in which.

DESCRIPTION

Figures 1, 2:
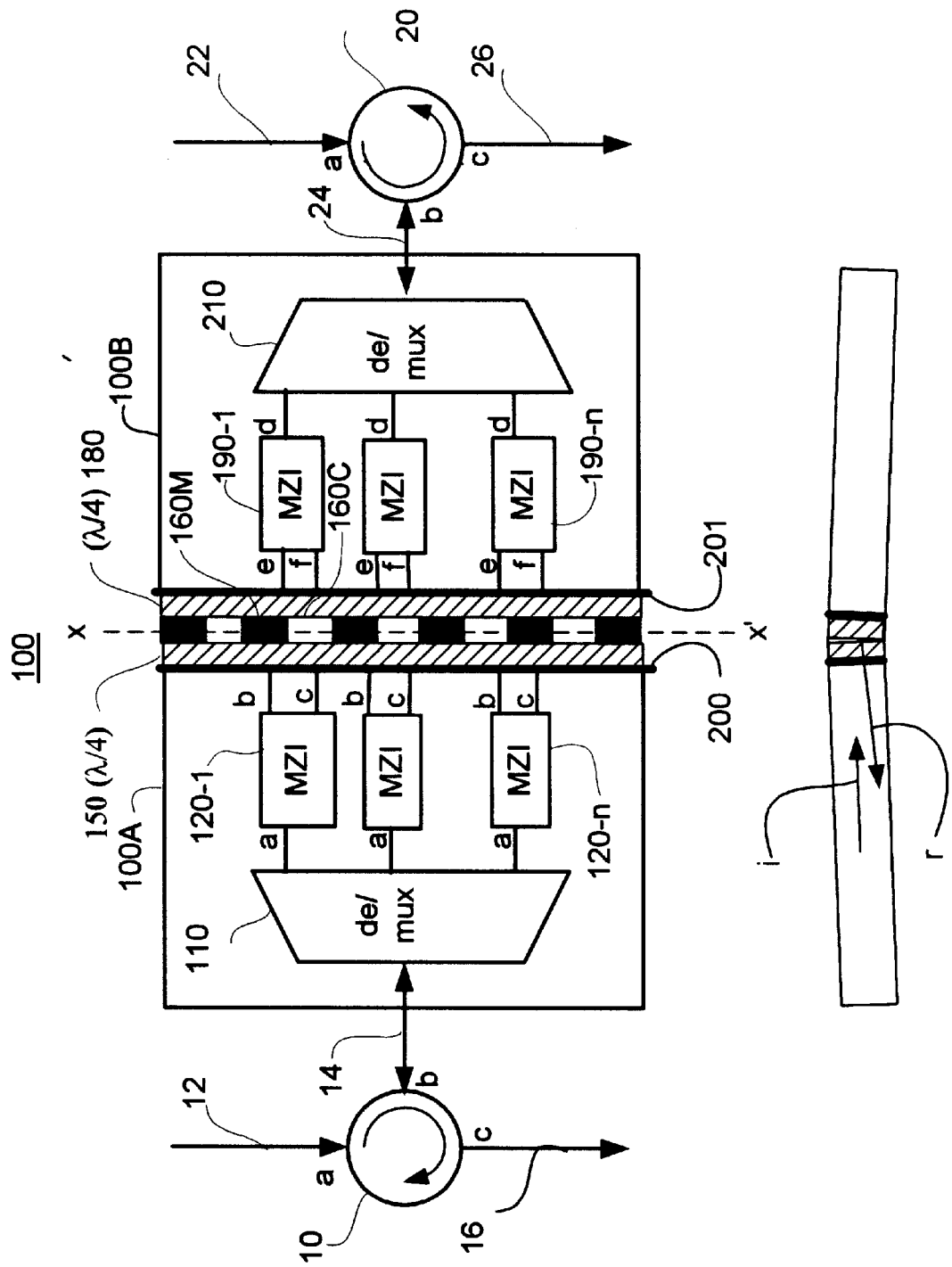
FIG. 1 depicts an n-channel 2×2 integrated optical cross connect according to the invention.
FIG. 2 shows an exaggerated edge view of the interface portion of FIG. 1.

In the drawing, an integrated assembly according to the invention is depicted by a planar waveguide chip 100 having a fiber input 14 at its lefthand end, a de/multiplexer 110 and a first array of Mach-Zehnder interferometers (hereinafter "MZI") 120-1 through 120-n, a quarter wave plate 150, a striped mirror 160, a second quarter wave plate 180, a second array of MZIs 190-1 through 190-n a de/multiplexer 210 and a fiber input 24 at its righthand end.

Advantageously, the device 100 is fabricated with components 110, 120, 190 and 210 integrated thereon. Then wafer 100 is sawn in two at x–x', the saw cuts of both halves 100A, 100B are polished or dressed to provide optically sufficient surfaces. Quarter wave strips with birefringence axes oriented at 45 degrees to the chip axes 150, 180, which are optional, are then affixed to the glass strips 200, 201. Then the facet is mirrored, preferably by evaporation using a mask, to provide striped mirror 160. The two halves 100A, 100B are then glued together at x–x' to form integrated assembly 100.

In operation, fiber 12 transports a plurality of n optically distinct channel signals and applies them to port "a" of circulator 10. The optical channel signals exit at port "b" of circulator 10 which is connected by fiber 14 to de/multiplexer 110 of chip 100. De/multiplexer 110 separates the channel signals into n spatially distinct paths, each being applied to the "a" input of a respective MZI of array 120-1 through 120-n. Each MZI has a terminal "a" connected by a waveguide to de/multiplexer 110, and a terminal "b" and "c" to which waveguides may be attached to direct light either to a reflective part 160M or to a clear part 160C of mirror 160 to define the operating window of the device. Thus, for example, as shown in the drawing, terminal "b" of MZI 120-1 is directed to the reflective part 160M of mirror 160 while terminal "c" of MZI 120-1 is directed to the clear part 160C of mirror 160.

The light from the waveguides connected to terminal "b" of MZI 120-1 is directed to the reflective part 160M and so passes through quarter wave plate 150 once on its way toward reflective part 160M and once after reflection. Consequently this light is rotated in polarization such that transverse-electrically (TE) polarized light becomes transverse magnetically (TM) light and vice versa.

The light from the waveguide connected to terminal "c" of MZI 120-1 is directed to the clear part 160C of mirror 160 where it enters terminal "e" of MZI 190-1. This light is phase shifted by MZI 190-1 and exits terminal "d" where it is remultiplexed by de/multiplexer 210 and is applied to port "b" of circulator 20 and exits at port "c" and is delivered to output fiber 26.

In similar fashion, the plurality of n light channels carried by fiber 22 enter port "a" of circulator 20 and exit port "b"

where the channels are de-multiplexed by de/multiplexer 210. Multiplexer 210 separates the channel signals into n distinct paths, each being applied to the "d" input of a respective MZI of array 190-1 through 190-n. Each MZI has a terminal "d" connected by a waveguide to de/multiplexer 210 and a terminal "e" and "f" to which waveguides may be attached to direct light either to a reflective part 160M or to a clear part 160C of mirror 160 to define the operating window of the device. Thus, for example, as shown in the drawing, terminal "e" of MZI 190-1 is directed to the reflective part 160M of mirror 160 while terminal "f" of MZI 190-1 is directed to the clear part 160C of mirror 160.

The light from the fiber connected to terminal "e" of MZI 190-1 is directed to the mirrored part 160M and so passes through quarter wave plate 180 once on its way toward mirror 160M and once after being reflected by mirror 160M. The light from the fiber connected to terminal "f" of MZI 190-1 is directed to the clear part 160C of mirror 160 where it enters terminal "c" of MZI 120-1. This light is phase shifted by MZI 120-1 and exits terminal "a" where it is remultiplexed by de/multiplexer 110 and applied to port "b" of circulator 10 and exits at port "c" and delivered to output fiber 16. Thus, by appropriately directing the fibers from the MZI arrays either to clear or to mirrored portions of the mirror the light may be reflected and cancelled or passed through and phase shifted in any desired manner.

It is to be noted that the fiber from terminal "e" of MZI 190-1 that is directed to reflective part 160M of mirror 160 is advantageously laterally offset from the fiber connected to terminal "b" of MZI 120-1 so that even if the reflective part 160M does not have a transmissivity T of zero, no light from terminal "e" of MZI 190-1 can enter terminal "b" of MZI 120-1, and vice versa.

Further, as shown in the edge view FIG. 2, the waveguides "c" and "f" are at an angle (shown exaggerated in the drawing) so that back reflections for the switch-condition are suppressed. Reflected light "r" at the interface will penetrate the substrate rather than one of the fibers associated with any of the MZIs.

What has been shown is deemed to be illustrative of the principles of the invention. It will be apparent to those skilled in the art that the same kind of device can be made in InP or other planar lightwave circuit material. Also, one could create artificial mirrors made out of a 1-to-2, MMI of which both outputs are connected by the same physical single waveguide. Further and other modifications may be made without departing from the spirit and scope of the invention.

What is claimed is:

1. A device for the frequency transposition of optical signals liable to be at different wavelengths and capable of delivering, at output, these data elements at one of the reception wavelengths, comprising:

an integrated circuit having a multiplexer/demultiplexer at each end;

a switch array respective to each said multiplexer/demultiplexer;

a striped reflective interface between each said switch array; and an array of fibers for directing light from each said switch array to predetermined portions of said striped reflective interface.

2. A device according to claim 1 wherein said predetermined portions include a first portion having substantial transmissivity and a second portion having substantial reflectivity.

3. A device according to claim 1 further comprising a circulator respective to each said multiplexer/demultiplexer.

4. A device according to claim 3 wherein light is directed from an intermediate terminal of each said circulator to a respective multiplexer/demultiplexer.

5. A device according to claim 4 wherein light crossing said interface is directed from said respective multiplexer/demultiplexer to said intermediate terminal of said circulator.

6. A method of fabricating an integrated circuit chip for the frequency transposition of optical signals comprising:

sawing in half a substrate having an MZI array at each end;

optically dressing the sawed portions of said substrate;

depositing a partially reflective surface on said dressed portions;

reassembling the halves to create a partially reflective interface; and affixing waveguides to direct light from each MZI to a predetermined portion of said interface.

7. A method according to claim 6 wherein said substrate includes a plate having a thickness one quarter the wavelength of the central wavelength on each side of said interface.

8. A method according to claim 7 wherein said substrate includes a multiplexer/demultiplexer respective to each said MZI array.

9. A method according to claim 8 wherein some of said waveguides direct light to a substantially reflective portion of said interface.

10. A method according to claim 9 wherein waveguides directing light to a corresponding reflective portion of said interface are laterally offset from each other.

11. A method according to claim 10 wherein waveguides directing light to the other half of the chip are at an angle to the interface between the halves.

* * * * *